United States Patent
Porter et al.

(10) Patent No.: US 6,391,198 B1
(45) Date of Patent: May 21, 2002

(54) METHOD AND APPARATUS FOR SLUDGE AND OIL SEPARATION FROM AQUEOUS SOLUTIONS/EMULSIONS

(75) Inventors: Brian E. Porter, Lyons, IL (US); William J. Shortreed, Columbia, SC (US)

(73) Assignee: Safety-Kleen Systems, Inc., Columbia, SC (US)

(*) Notice: Subject to any disclaimer, the term of this patent is extended or adjusted under 35 U.S.C. 154(b) by 0 days.

(21) Appl. No.: 09/887,841

(22) Filed: Jun. 22, 2001

(51) Int. Cl.$^7$ .................... B01D 21/24; B01D 21/00; B01D 36/04; B23Q 11/00
(52) U.S. Cl. ............... 210/241; 210/167; 210/532.1; 210/120; 210/436; 210/258; 210/259; 210/416.1; 210/299
(58) Field of Search ............... 210/167, 120, 210/532.1, 513, 258, 259, 416.1, 416.5, 299, 241, 436

(56) References Cited

U.S. PATENT DOCUMENTS

| | | |
|---|---|---|
| 1,748,541 A | 2/1930 | Davitt et al. |
| 2,057,624 A * | 10/1936 | Burkhart |
| 2,330,508 A | 9/1943 | McColl |
| 2,348,723 A | 5/1944 | Boosey |
| 2,846,073 A | 8/1958 | Hopper |
| 3,080,057 A | 3/1963 | Mobley |
| 3,527,348 A | 9/1970 | Lalonde et al. |
| 3,856,682 A | 12/1974 | Summers |
| 3,862,039 A | 1/1975 | Summers |
| 3,862,040 A | 1/1975 | Preus et al. |
| 4,264,454 A | 4/1981 | Ankersmit |
| 4,422,931 A | 12/1983 | Wolde-Michael |
| 4,684,467 A | 8/1987 | Cloud |
| 4,867,877 A * | 9/1989 | Hansen et al. |
| 4,935,154 A | 6/1990 | Arnold |
| 4,959,146 A * | 9/1990 | Kristan |
| 5,030,342 A | 7/1991 | Ortega |
| 5,053,145 A * | 10/1991 | Ellison |
| 5,059,332 A | 10/1991 | Satoh |
| 5,066,407 A | 11/1991 | Furlow |
| 5,104,529 A * | 4/1992 | Beckar |
| 5,176,798 A | 1/1993 | Rodden |
| 5,326,469 A | 7/1994 | Thompson |
| 5,445,730 A | 8/1995 | Pattee |
| 5,514,266 A * | 5/1996 | O'Brien et al. |
| 5,554,277 A * | 9/1996 | Rief et al. |
| 5,601,705 A * | 2/1997 | Glasgow |
| 5,897,773 A * | 4/1999 | Rhodes |
| 6,004,470 A * | 12/1999 | Abril |
| 6,096,198 A * | 8/2000 | Underhill |
| 6,126,822 A * | 10/2000 | Ostermeier et al. |
| 6,322,694 B1 * | 11/2001 | Iliadis et al. |

* cited by examiner

Primary Examiner—Thomas M. Lithgow
(74) Attorney, Agent, or Firm—James T. FitzGibbon; Vedder Price Kaufman & Kammholz (57) ABSTRACT

An oil-water and oil emulsion separation system using a plurality of transport vessels as the separation tanks. The containers or tanks are arranged in series with sludge or oil removed first and thereafter remaining oil is removed and finally a relatively pure aqueous solution is returned to the system. The unit is useful with parts washers or any apparatus with which water is contaminated by free oil or sludge. A floating skimmer is placed in the user's sump and a vacuum draws this into a series of containers in which it is processed and in which sludge and oil are successively separated. A positive displacement pump is used. A manifold having vacuum relief valves for at least one container is also provided. In one embodiment, flow restrictors are placed in at least one manifold.

21 Claims, 4 Drawing Sheets

METHOD AND APPARATUS FOR SLUDGE AND OIL SEPARATION FROM AQUEOUS SOLUTIONS/EMULSIONS

BACKGROUND OF THE INVENTION

The present invention relates generally to oil-water and emulsion separation systems, and more particularly, to a system which includes components that are placed in an oil-contaminated water-based system and arranged in series with sludge or oil removed first, and then secondarily, oil, oil removal, and finally a relatively pure aqueous solution results, and this solution is returned to the system. The unit is useful with parts washers and other forms of apparatus which use water and are contaminated by free oil as at least a part of their process fluids. Preferably, the system conveniently uses the same transport containers in which oil, soap or other component is supplied as an integral part of the removal system.

The term "washing fluid" is intended to be an all-inclusive term, which includes water, any number of emulsifying agents, cutting oils, lube oils, way oils and lubricants of various kinds, additives, as well as impurities created by cutting, drilling or other machining operations, including grinding or abrasive metal reduction. The term also includes fluids not strictly used for washing, but which are nonetheless subject to oil/water separation, such as those used in aqueous-based parts washers. For purposes of illustration, however, the description herein is primarily directed to those creating sludge or oil to be separated from the aqueous component.

In the preferred form, a floating skimmer is placed in the user's machine sump and this is able to transport oil and contaminant-laden fluid to the treating elements. The remainder of the elements making up the system are preferably drums or transport vessels, together with hoses, manifolds, vacuum reliefs and other components. The servicing of the apparatus is carried out by a contractor who specializes in removing sludge and/or oil from the premises.

In the preferred form, the containers are removable and replaceable, and the components which are used in processing the fluids are reusable.

In one embodiment, the system contains a floating contaminant removal device, termed a "skimmer", which has an inlet lying just beneath the surface of the liquid. In another embodiment, there is a dip tube or pick up which is dispensed in the body of the washing fluid bath itself. The liquid itself is continuously recirculated by means of a positive displacement pump and passes through one or more drums. The sludge may collect at the bottom of the drum, and the oils and other lighter-than-water contaminants are picked up from the top surface of the washing fluid in this embodiment by a floating skimmer and directed via suitable tubing through an oil trap, and finally, through a positive displacement pump before being returned in a substantially free of non-emulsified oil condition to the machine bath or other source of liquid. The oil trap, where present, removes tramp oil, floating solids, and other non-emulsified, lighter-than-water impurities, and in some cases, heavier than water contaminants which are trapped or otherwise contained in the oil or emulsified phases.

The system is designed to clean and maintain a variety of liquid systems which primarily use water, but also contain, in most cases in emulsion form, a lubricant for the machine, and various surface active gents which maintain the oil-water emulsion and prevent corrosion. There may be other components whose identity will vary somewhat with the application and the details of whose composition is not particularly relevant to the present invention.

An advantage of one form of the present invention is that it gives an outside contractor or supplier the ability periodically to service the apparatus without disturbing the principal machine, or compromising its operation. Thus, service may be performed by removing the sludge or oil from the trap or separator. This is accomplished merely by disconnecting the electrical power supply to the pump and disconnecting the fluid conduits leading to the various sludge or oil traps. In this way, the customer's principal machine need undergo no significant down time, or no down time at all. Most or all of the maintenance can be performed without stopping the principal machine.

The skimmer and the hose connecting it to the remainder of the apparatus may be simply serviced or replaced. This is because the skimmer preferably has no moving parts and preferably only one adjustable part. The height of the inlet may be adjusted simply by turning the threaded insert to raise or lower the skimmer inlet and thus to adjust the skim gap.

The sludge trap when operated without an oil trap preferably consists of a drum of the type used to transport liquids, namely, a 16-, 30-, or 55-gallon drum. The inlet at the source lies on or near the bottom of the customer sump in one embodiment. The hose leads to the sludge trap and the inlet to the drum is a fraction of the drum depth. The outlet connects to a fitting with a vacuum relief port. The liquid is advanced by a positive displacement pump, and the outlet of the pump connects with the customer sump to return the sludge-free fluid to the sump.

The construction of an oil trap according to the invention is such that a somewhat non-emulsified oil-water mixture enters the trap at a manifold and the liquid phase is directed downwardly well past the vertical middle of the trap. As the oil coalesces, it floats to the top and forms several layers. An air layer is at the top, an oil layer is next, then an emulsified oil-and-water layer, and finally, a lowermost water layer is formed. Accordingly, the water phase lies adjacent the bottom of the oil trap housing. The return tube extends toward the bottom of the vessel and has a connection at its upper end to the positive displacement pump; it is also in communication with the air in the air-tight manifold. The oil accumulates below a bleed hole in the manifold portion of the oil trap. The water passes from near the bottom to the return tube and hence is substantially oil-free. A strainer screen and a filter may be introduced between the trap and pump to protect the positive displacement pump from harmful impurities or components on this portion of the apparatus.

The positive displacement pump is preferably a bellows-, oscillating-, or diaphragm-type pump which functions at various flow rates but efficiencies are determined by the size of the drum used. A bellows-, oscillating-, or diaphragm-type pump is selected because of its self-priming capability. Preferably, the rate of the flow of the oil pump is selected so as to allow an appropriate residence time for oil and water separation within the oil trap. Additionally, a positive displacement pump provides low shear forces.

Another embodiment uses two identical oil trap drums cascaded so as to empty a more clear fluid from the first to the second. The two drums each include a manifold with an inlet, an outlet and a bleed opening, and the second one includes a vacuum break. Only one positive displacement pump is used, preferably just past the outlet of the second drum.

Still another embodiment cascades the sludge trap with an oil trap, with the oil trap having the bleed opening and the vacuum relief as well as the same positive displacement pump. This arrangement may have a skimmer or a bottom pick up, or both. Other arrangements may be found suitable.

The vacuum opening on the manifold may permit vacuum to be broken so as to protect the pump from becoming clogged or especially, collapsing one or more drums in operation.

In view of the failure of the prior art to provide a simple, integrated cost-effective system for liquids, including sludge and oil separators, that uses transport vessels as a part thereof, it is an object of the present invention to provide such an integrated or independent oil and/or sludge trap system.

It is another object of the invention to provide a sludge trap system, which, except for the pick up and discharge elements, lies entirely outside the apparatus with which it is used, and hence is functionally independent of such apparatus.

Yet another object of the invention is to provide a system which will both pick up sludge and oil and separate them from water.

An additional object of the invention is to provide a pump which is operable by ordinary, plug-in low voltage shop current available in many locations.

A still further object of the invention is to provide an apparatus wherein the periodic servicing may be carried out in a matter of minutes, which is due to the nature and arrangement of components.

Another object of the invention is to provide an oil trap or separator which may be serviced and/or removed and replaced by a service organization without materially disturbing the operation of the customer's principal system/machine.

An additional object of the invention is to provide an oil and/or sludge trap with a vacuum relief to avoid damage to these parts.

Still another object of the invention is to provide a modular oil trap or sludge trap which may be used in cascade form in any order or quantity to meet the specific applications, volumes, and separation requirements of the customers.

Another object of the invention is to provide a bleed hole in the manifold for allowing air to pass through the system without further emulsifying the mixture and for maintaining the level of liquid in the drum(s).

A still further object of the invention is to provide a system which uses standard transport vessels such as drums as the sludge—or oil traps and hence require very few special parts to make a complete apparatus.

SUMMARY OF THE INVENTION

The present invention achieves its objects and others by providing a sludge trap and oil trap with drums, manifolds, bleed openings and vacuum relief as well as a positive displacement pump, all adapted to work with or without a skimmer for picking up floating and submerged oil and sludge.

The manner in which the foregoing objects and advantages are achieved in practice will become more apparent when considered in connection with the detailed description of the preferred embodiments of the invention set forth by way of example and shown in the accompanying drawings wherein like reference numerals indicate corresponding parts throughout.

DETAILED DESCRIPTION OF THE INVENTION

Although the present invention may be embodied in a number of different forms and the elements may be arranged in different configurations, several preferred embodiments of the invention are shown. Other embodiments or arrangements of components will also be apparent to those skilled in the art, and such changes or modifications may be made without departing from the scope of the invention.

Figure 1:
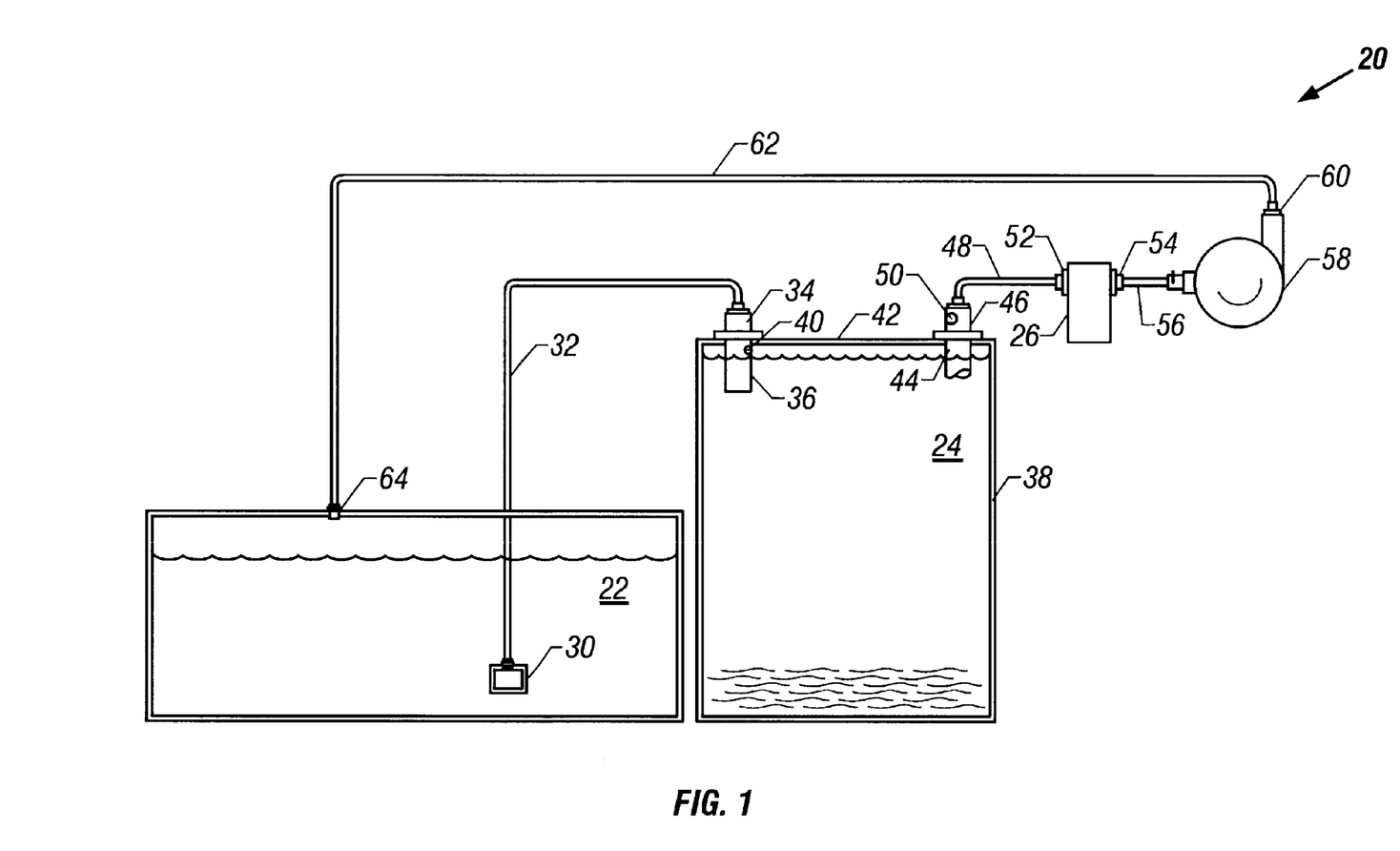
FIG. 1 is a view, largely diagrammatic, showing the major elements of one embodiment of the sludge trap of the present invention.

Referring now to the drawings in greater detail, there is shown in FIG. 1 a schematic view of one of the simple forms of the invention, namely, a sludge trap. In this embodiment, there are several important components. The system is generally designated 20, and it includes a customer sump 22, a sludge trap 24, an optional filter 26 and a positive displacement pump 58

The sump 22 belongs to the customer, and contains basically water, but also includes sludge components, such as grease washed from machine parts, metal shavings, filings or other residue from machining operations. It may also include tramp oil, soapy and/or other aqueous residue from a parts washer, coolants from a machining center or the like. The pick up of this residue is made from a scavengers 30 which picks up bottom sludge components as well as suspended solids of various kinds. From the scavenger 30, the liquids are fed through a hose 32 to an inlet fitting 34 having an outlet end 36 lying near the top of the sludge trap 24 in the form of a barrel 38. The fitting 34 passes through an opening 40 in the top 42 of the barrel 38 which is air- and liquid-tight.

Another air- and liquid-tight passage 44 is provided for the outlet fitting 46 which is connected to a hose 48 leading to the optional filter 26. Very importantly, the fitting 46 includes a vacuum relief passage 50 which preferably is set at 4–20 psi, preferably 10–15 psi.

The optional filter 26 contains a pair of small fittings 52, 54, the outlet fitting 54 of which is connected to a hose 56 which in turn is connected to a positive displacement pump 58. The pump outlet 60 passes to a return hose 62 which then has an outlet 64 in the customer sump 22.

The positive displacement pump typically operates at about up to 5–15 psi, and draws fluid from the sump 22, including bottom sediment and other sludge-like constituents and causes them to pass through the hose 32 to the inlet fitting. From here, the sludge falls to the bottom of the trap 38, while the liquid phase enters the fitting 34 under the influence of the vacuum created by the pump 58. As long as the pump can pull a partial vacuum, liquid flows through the lines 48, 56, while liquid and sludge pass through line 32. The sludge falls out and eventually fills the barrel 38 which may then be emptied in due time.

In the event the vacuum level surpasses the setting on the vacuum relief valve 50, the valve merely admits air to prevent collapse of the lines, and most importantly, the drum 38.

The hoses, except for those upstream of the sludge or oil trap, are preferably color-coded, and will withstand at least 10 psi and preferably much more. The filter 26 is also rigid and typically capable of withstanding much more than 50 psi. The positive displacement pump 58 can draw vacuum of from 5 to 14 psi. It is preferably of the diaphragm-, oscillating-, or bellows-type, but may be a piston type or other style of pump. it is preferably driven by an electric motor, (not shown), but may be air-operated if desired.

The drum, as pointed out above, is a 16-, 30- or 55-gallon drum. This is a feature of the invention which is important, although not absolutely necessary. Thus, a cover with an inlet and an outlet is all that needs to be provided in addition to the selected vessel. All the working elements of the system are extended to the drum 38, but the drum 38 makes up an important portion of the device; the drum 38 may be removed and replaced since it is a commodity and not necessarily associated with any particular set of components.

Figure 2:
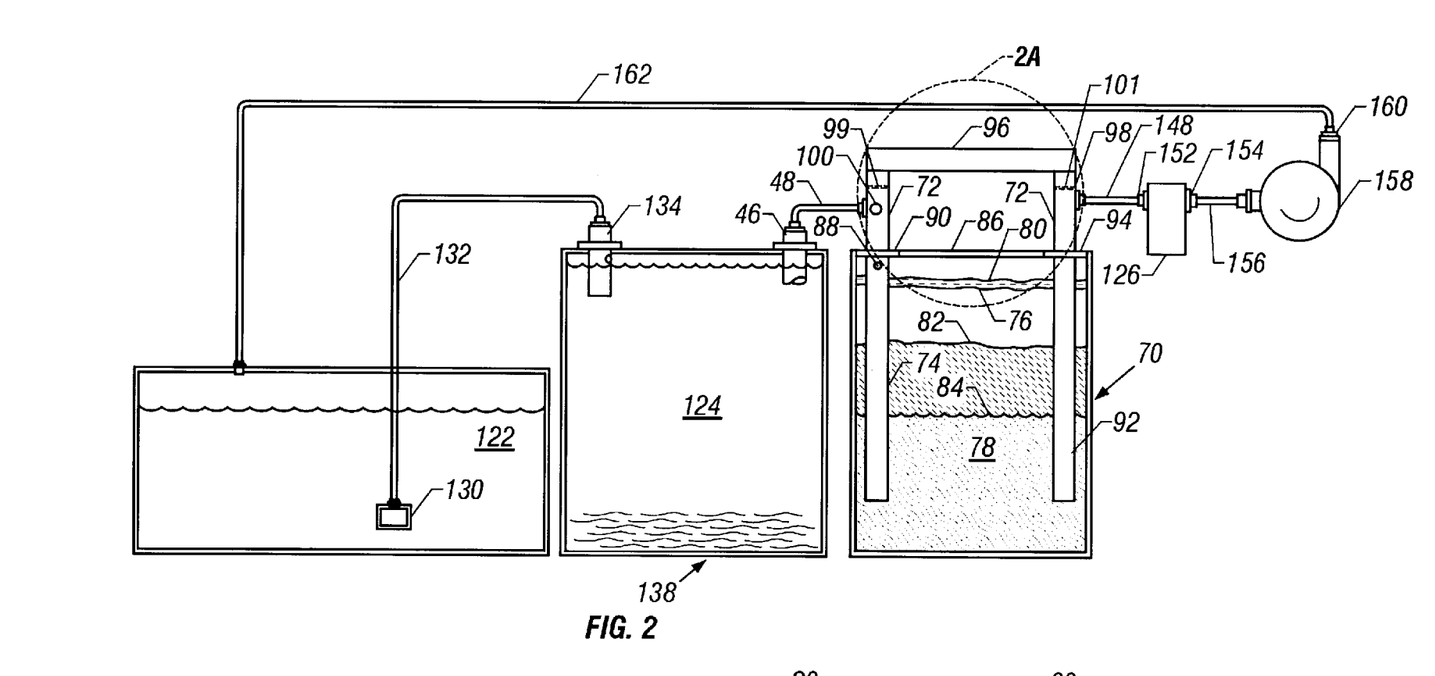
FIG. 2 is a view, largely diagrammatic, of the major elements of the invention and similar to FIG. 1 except that it also includes an oil trap in series with the sludge trap.

Referring now to FIG. 2, another embodiment is shown in which a drum 138 serves as a sludge trap. The drum 138 is shown to be associated with an oil trap generally designated 70 in cascaded relation, that is, the outlet fitting 46 and hose 48 are directed into an inlet fitting 72 of the oil trap 70. More particularly, the fitting 72 includes a dip tube 74 that extends well below the level 76 of liquid in the drum 78. In use, there is a certain amount of air, then an oil layer shown at 80, a layer 82 of emulsified oil and water, and finally, toward the bottom, a water layer 84.

The dip tube 74 includes, near but spaced slightly below the cover 86, a bleed hole 88. The dip tube 74 is fit with an air- and liquid-tight seal 90 to the cover 86.

A second component of the oil trap 70 is a second or outlet dip tube 92 which typically extends well into the water layer 84 in the drum 78. There is a seal 94 between the second dip tube 92 and the drum cover 86, and of course the cover is tightly sealed to the drum 78. A manifold leg 96 extends between these fittings 72, 98 and this equalizes the suction or vacuum between these components and permits air to bypass the liquid phase without creating any additional emulsion. In addition, a vacuum relief 100 is provided in one leg of the manifold to prevent collapse of the components.

Besides these elements, there is also provided an intermediate hose 148, inlet and outlet fittings 152, 154 and an optional filter 126. Another line 156 leads to a positive displacement pump 158, having a fitting 160 connected to the return hose 162. The other elements of the sludge trap such as the customer sump 122, the inlet hose 132, the inlet fitting 134, the drum 138 and the outlet fitting as well as the connection 148 are the same as their counterparts in FIG. 1.

This embodiment is useful where the recirculated liquid includes both substantial amounts of sludge and heavier-than-water impurities and oil/oil and water emulsion. The sludge accumulates in the sludge trap 124, and the oil and water are passed to the oil trap 70. Here the dip tubes extend well below the levels of oil and oil/water emulsion, leaving the water to pass back to the customer sump 122. Again, if the vacuum level becomes excessive, the relief valve 100 is opened before the drums or the hoses collapse. Only the vacuum relief 100 need be provided, since the drums 78, 124 are in series.

Figure 2A:
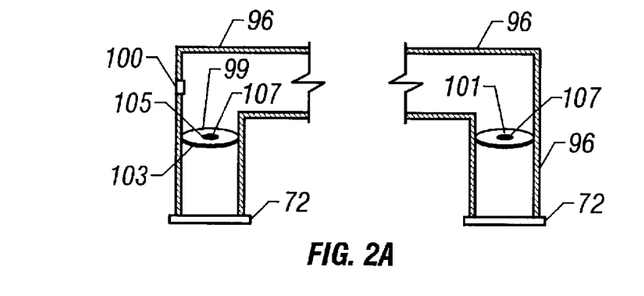
FIG. 2A is an enlarged view of portions of the manifold containing the "pucks" or flow restrictors which are used to help coalesce the liquid and break the foam.

Because the washing fluid or emulsion, etc., as processed generally includes surfactants of various kinds, the movement through the drum(s) fittings and dip tubes creates a great deal of foam which is a drawback to processing. Consequently, as shown in FIG. 2 and shown enlarged in FIG. 2A, each of the manifolds includes at least one and preferably two flow restrictors or "pucks" 99, 101 in its vertical legs 98, 100. These have the effect of breaking the foam, even relatively stable foam, and allowing it to coalesce in the legs 98,100, and run down toward the fittings 90, 94. The pucks in the form shown have a round, outside diameter 103, a flat body surface 105 and a small center opening 107 therein. Other configurations may be used.

Figure 3:
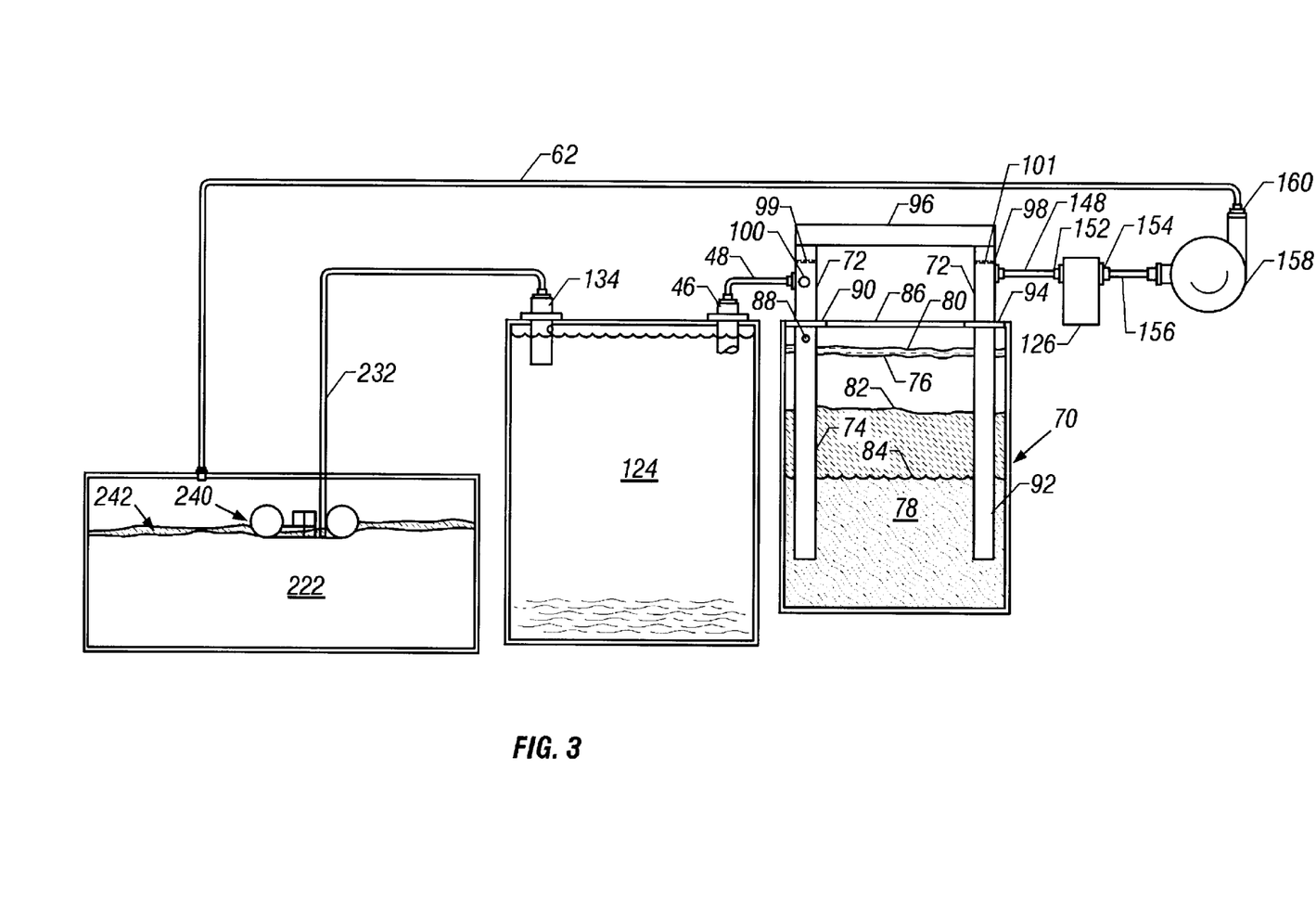
FIG. 3 is a diagrammatic view similar to FIG. 2 except that it also uses a skimmer as a pick up from the customer sump; and, FIG. 4 is a diagrammatic view showing two cascaded oil traps, showing details of an interconnect system including a bleed hole in each dip tube and a vacuum relief in the downstream manifold.

Referring now to FIG. 3, another embodiment is shown which is very similar to the embodiment of FIG. 2. In fact, the only difference in these embodiments is the manner in which the liquid is picked up from the customer sump 222. This is accomplished by a skimmer generally designated 240. This skimmer floats atop the liquid 242 and feeds the inlet hose 232. In the alternative, other adjustable type skimmers of the type described in U.S. patent application Ser. Nos. 09/470,872 and 09/649,832 U.S. Pat. No. 6,322, 694 may be used.

In operation, the apparatus operates like the others; the only difference is the manner and type of impurities being picked up. In some cases, there can be amounts of sludge picked up that are still collected with a skimmer; these are emulsified in use, but coalesce into sludge with the passage of time.

Figure 4:
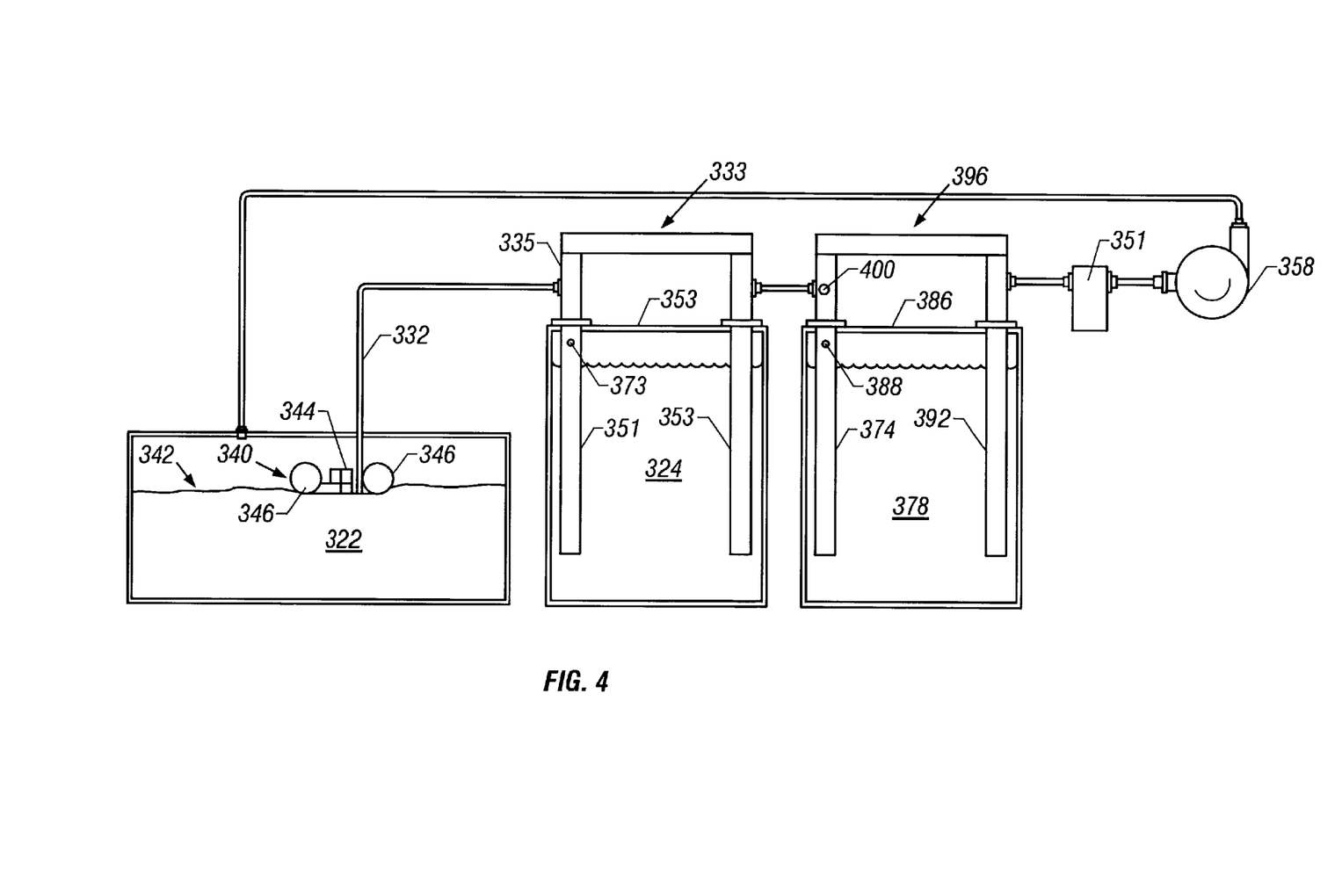

Referring now to FIG. 4, still another embodiment is shown. In this embodiment, there are two drums 324, 378 cascaded or placed in series. The pair are fitted with a single skimmer 340 of the same type as shown in FIG. 3. The skimmer 340 floats atop the liquid level 342 in the customer sump 322, and has an inlet 344 between the balls 346 of the skimmer. The inlet is connected to the inlet hose 332, which in turn is connected to one leg 335 of one manifold generally designated 333.

The two traps 324, 378 are connected in series with one another. The two manifolds 333, 396 each have two dip tubes 351, 353 and 374, 392. One dip tube 351, 374 of each pair has a bleed opening 373, 308, and all four tubes are sealed respectively to the two covers 353, 386. Only one vacuum relief 400 is required since the drums are connected in series.

The final filter 351 and the positive displacement pump 358 are the same as their counterparts in the earlier figures. In operation, the two-drum separator separates oil and water with a slight difference. The first drum 324 can operate until it is completely filled with oil, whereupon the second drum 378 operates. However, the second drum may operate before the first drum is filled, and in this case, it acts to improve or add to the efficiency of separation.

As illustrated, the pump is shown to draw or pull in suction, although conceivably, it could be used to push the liquids through the drums. Such arrangement would not be preferred, however.

It will thus be seen that the present invention provides a simplified, integrated system for removing floating and suspended contaminants from a customer machine, all requiring no down time for service or replacement, having a number of advantages and characteristics including those expressly pointed out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. A sludge trap apparatus for removing sludge and sludge-forming contaminants from an oil-containing washing fluid bath associated with a given customer machine, said sludge trap apparatus comprising, in combination, a pick up tube for ingesting contaminants and water from a portion of said washing fluid bath, a sludge receiver in the form of a drum, a cover for said drum disposed in fluid-tight relation to said drum and including an inlet fitting and an outlet fitting each positioned in fluid-tight relation to said cover, an inlet pipe attached to said inlet fitting and extending downwardly into said drum, an outlet pipe extending upwardly from said drum interior and connected to said outlet fitting, a positive displacement pump, a conduit connecting said outlet fitting to an inlet of said positive displacement pump, said pump being arranged so as to draw from said pick up tube through said drum and into said pump, and a return line extending from an outlet of said positive displacement pump to said washing fluid bath, and a vacuum relief port disposed in said outlet fitting and being normally closed but operable at a predetermined vacuum level to prevent said conduits and said drum from collapsing, said sludge trap in use being filled with an upper layer of washing fluid and a sludge layer beneath said washing fluid layer whereby said sludge may be separated from said washing fluid and said washing fluid passes through said sludge trap and out said outlet into said pump and returns from said pump to said washing fluid bath.

2. A sludge trap apparatus as defined in claim 1, wherein said drum is the same vessel that is used as a transport vessel for liquid components of said washing fluid.

3. A sludge trap apparatus as defined in claim 1, which additionally includes a filter unit disposed upstream of said positive displacement pump.

4. A sludge trap apparatus as defined in claim 1, which additionally includes a hose extending from said, a filter and a hose extending to said positive displacement pump inlet.

5. A sludge trap apparatus as defined in claim 1, wherein said pick up tube extends into and well beneath the surface of said fluid bath.

6. A sludge trap apparatus as defined in claim 1, wherein said pick up tube is in the form of a skimmer adapted to ingest surface and non-surface contaminants from said bath.

7. A sludge trap apparatus as defined in claim 1, which additionally includes between said drum outlet fitting and said positive displacement pump, an oil trap including a second drum having, an inlet, an inlet dip tube, an outlet, an outlet dip tube, a connection between said inlet and outlet, a bleed hole in said inlet dip tube, and a vacuum relief valve in said connection.

8. An apparatus for removing both floating contaminants and subsurface contaminants from an oil-containing washing fluid bath associated with a given machine, said apparatus including, in combination, a floating skimmer for picking up floating contaminants including oil from the upper surface of said washing fluid, a sludge trap, said sludge trap comprising a receiver in the form of a first drum, a cover disposed over said drum in fluid-tight relation, an inlet fitting disposed in fluid-tight relation to said cover and an inlet pipe depending into said drum from said inlet fitting, an outlet fitting disposed in fluid-tight relation to said cover and an outlet pipe extending downwardly into said drum from said fitting, an oil trap including a conduit extending from said sludge trap to said oil trap, said oil trap including a second drum and a second cover for said second drum disposed in fluid-tight relation thereto, second inlet and outlet fittings disposed in fluid-tight relation to said second drum, a second inlet dip tube extending into said second drum from said second fitting and a return tube extending upwardly into said second outlet fitting, a second fluid-tight connection between each of said, second inlet and said second outlet fittings, a positive displacement pump and a conduit extending from said second connection at said second outlet fitting to said pump, a vacuum relief valve in said second, connection and a return line from said pump to said sump, whereby said sludge and said oil may be removed in use from said washing bath.

9. An apparatus as defined in claim 8, wherein said first drum is the same vessel that is used as a transport vessel for liquid components of said washing fluid.

10. An apparatus as defined in claim 8, wherein said second inlet dip tube extends substantially into said second drum.

11. An apparatus as defined in claim 8, which includes a filter unit between said oil trap and said positive displacement pump.

12. An apparatus as defined in claim 8, each said connection between said inlet and outlet fittings being in the form of a manifold having two vertical legs and a horizontally extending connection therebetween.

13. An apparatus as defined in claim 12, wherein at least one vertical leg of said manifold includes a puck for breaking foam.

14. An apparatus as defined in claim 12, in which each vertical leg of said manifold includes a puck for breaking foam.

15. A cascaded system for removing oil from a customer sump having an oil containing washing fluid bath, said system comprising, in combination, a pick up for water, oil and associated materials from said washing fluid bath, first and second drums each having a fluid-tight cover and each including inlet and outlet fittings and a dip tube associated with each fitting, said dip tubes extending into said drum and a connection between each pair of said inlet and outlet fittings outside said drum, a positive displacement pump, a conduit extending from said outlet of said first drum to the inlet of said second drum, and a conduit extending between the outlet of said second drum and the inlet of a positive displacement pump, a return line to said washing fluid from said positive displacement pump, and a bleed hole just beneath said cover in at least one of said dip tubes, and a vacuum relief valve in said connection of at least one of said drums whereby said first drum performs an oil-water separation and said second drum performs an additional separation on said oil-water mixture.

16. A cascaded apparatus as defined in claim 15, wherein said first drum is the same vessel that is used as a transport vessel for liquid components of said washing fluid.

17. A cascaded system as defined in claim 15, wherein said dip tubes extend well into said drums.

18. A cascaded system as defined in claim 15, in which each said connection is in the form of a manifold having at least two vertical legs connected by a horizontal leg.

19. A cascaded system as defined in claim 18, wherein said manifold includes at least one puck in at least one of the vertical legs of said manifold to break foam.

20. A cascaded system as defined in claim 18, wherein each of said vertical legs of said manifold includes a puck therein to break foam.

21. A cascaded system as defined in claim 15, which additionally includes a filter unit disposed upstream of said positive displacement pump.

* * * * *

UNITED STATES PATENT AND TRADEMARK OFFICE
CERTIFICATE OF CORRECTION

PATENT NO.    : 6,391,198 B1
DATED         : May 21, 2002
INVENTOR(S)   : Porter et al.

It is certified that error appears in the above-identified patent and that said Letters Patent is hereby corrected as shown below:

Column 4,
Line 42, delete "scavengers" and insert -- scavenger --

Column 7,
Line 40, after "said", insert -- drum --
Line 51, delete "having, an inlet" and insert -- having an inlet --

Column 8,
Line 7, delete "said, second" and insert -- said second --
Line 11, delete "second, connection" and insert -- second connection --

Signed and Sealed this

Fifteenth Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,391,198 B1
DATED : May 21, 2002
INVENTOR(S) : Porter et al.

It is certified that error appears in the above-identified patent and that said Letters Patent is hereby corrected as shown below:

Column 5,
Line 59, delete "148" and insert -- 48 --

Column 6,
Line 45, delete "308" and insert -- 388 --

Signed and Sealed this

Twenty-fourth Day of December, 2002

JAMES E. ROGAN
*Director of the United States Patent and Trademark Office*